Oct. 30, 1923.
E. J. HARVEY
1,472,754
LEAF SPRING
Filed July 25, 1921
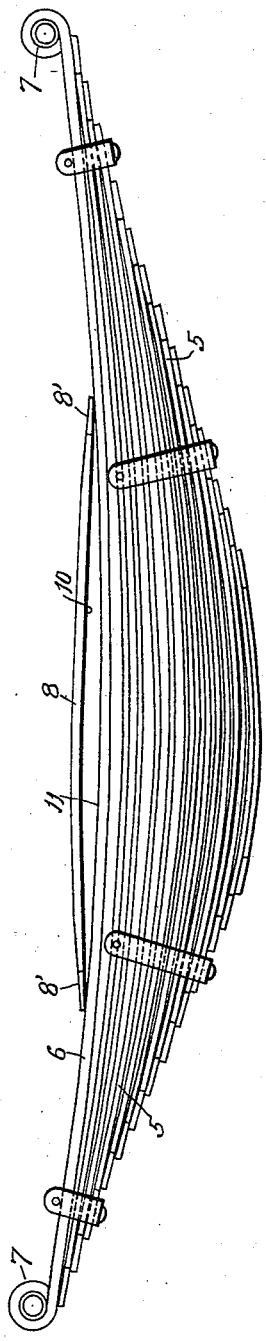
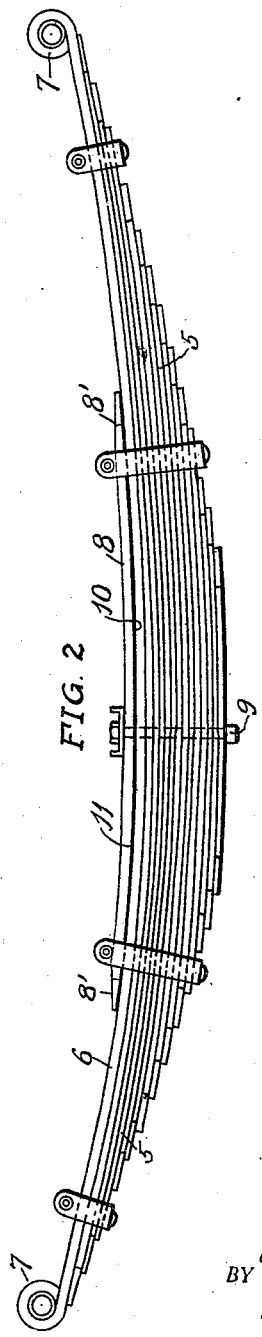
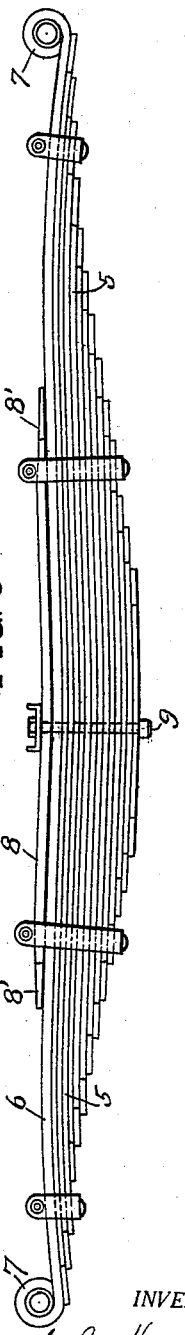
INVENTOR.
Edward J. Harvey.
BY Morsell & Keeney,
ATTORNEYS.

Patented Oct. 30, 1923.

1,472,754

UNITED STATES PATENT OFFICE.

EDWARD J. HARVEY, OF RACINE, WISCONSIN.

LEAF SPRING.

Application filed July 25, 1921. Serial No. 487,313.

*To all whom it may concern:*

Be it known that I, EDWARD J. HARVEY, a citizen of the United States, and resident of Racine, in the county of Racine and State of Wisconsin, have invented new and useful Improvements in Leaf Springs, of which the following is a description, reference being had to the accompanying drawings, which are a part of this specification.

This invention relates to improvements in leaf springs for use on automobiles and other vehicles.

Heretofore springs of this type have failed to give entire satisfaction because such springs when designed to permit the vehicle to ride smoothly over ordinary bumps and depressions and moderately uneven roadway surfaces fail to prevent undue shock to the vehicle when relatively large bumps and depressions in the roadway are encountered, and, if designed for smooth riding over such relatively large bumps and depressions, their rigidity prevents proper absorption of the shocks caused by contact with the ordinary bumps and depressions encountered. Springs of this type, as heretofore constructed, have been made of relatively thick material, the material ordinarily used averaging from 0.238 to 0.340 inch in thickness.

It is one of the objects of this invention to provide a spring of substantially the same amount of material as has been used heretofore in such springs, but having the material so distributed as to shape, length and thickness as to form a spring which will easily and quickly absorb vibrations incident to traveling over rough or uneven roads, and thus conduce to the comfort of the occupants of the vehicle and to the life of the vehicle.

A further object of this invention is to provide a spring of substantially the same amount of material as has been used heretofore in such springs, but having its resilience or shock absorbing power increased by reason of its comprising a master leaf and a larger number of relatively thin leaves, for example, in its preferred form the thin leaves are made of material not exceeding 0.203 inch in average thickness.

A further object of the invention is to provide a rebound leaf or plate in combination with a master spring and a plurality of relatively thin leaves, the rebound leaf being clamped to the medial portion of the spring in such a way as to reinforce the middle portion of the spring so that the ordinary shocks or strains will be entirely absorbed by the outer sections, while the greater shocks or bumps will be taken up in part by the outer sections of the spring, and in part by the reinforced medial or inner section of the spring and be absorbed before reaching the center part thereof, and the car will ride smoothly over both the small and relatively large bumps due to the relative curvature, thickness of the leaves and rebound plate.

The invention consists in the novel construction and arrangements to be hereinafter described and claimed for carrying out the above stated objects and such other objects as will appear from the following description of a certain preferred embodiment illustrated in the accompanying drawing, wherein—

Fig. 1 is an elevational view of the leaves assembled in readiness for clamping;

Fig. 2 is an elevational view of the leaves shown in Fig. 1, after being bolted together, the spring being applied to a vehicle, and Fig. 3 is a similar view showing the spring under load.

Like characters of reference designate like parts in the several views.

Referring to the drawing, it will be seen that the spring is composed of a plurality of comparatively thin normally concentrically curved leaves 5 of varying length arranged in stepped formation as shown and positioned against a master leaf 6 of approximately twice the thickness of the thin leaves. The leaf 6 is provided at its ends with loop portions 7 for connecting the spring at one end to portions of the chassis, not shown.

Heretofore springs of this type have been made of relatively thick leaves having an approximate average thickness of not less than 0.238 and often as high as 0.340 of an inch. The leaves of springs constructed according to the present invention, with the exception of the master leaf, are relatively thin, the average thickness not exceeding 0.203 of an inch. It has been observed that when a spring of a given thickness comprises leaves of relatively thin material, the spring will have considerably greater resiliency than a spring of the same thickness made up of a lesser number of leaves which are of relatively thick material, and that notwithstanding this gain in resiliency, no practical loss of load carrying power is sustained.

In combination with a spring constructed of a master leaf and leaves of relatively thin material, I preferably provide a rebound leaf or plate 8 having a curvature opposite to and preferably less than the curvature of the leaf 6, as shown in Fig. 1, and clamped down, see Fig. 2, to the leaf 6 by a bolt 9 which is inserted through centrally located holes in each of the leaves 5, 6 and 8, thereby fastening the said leaves firmly together at their middle portions. The rebound leaf or plate 8 is made approximately as thick as the master leaf 6 and while it may be straight or curved in any direction, it is preferably of such a degree of curvature opposite to the curvature of the master leaf 6 and the other leaves that when it is clamped down to the said leaves, the face 10 of the leaf 8 which was slightly concave in its unclamped position conforms to the face 11 of the leaf 6 and exerts a constant pressure on the leaf 6 under all conditions of loading due to the tendency of the leaf 11 to return to its original unclamped conformation.

Owing to this clamping pressure of the plate 8, that section of the assembled spring covered thereby is reinforced and has but slight movement under the light shocks caused by small bumps as said slight movement is practically absorbed near the end portions of the rebound leaf 8. The outer end sections of the spring are possessed of sufficient resiliency to absorb all of the shocks due to ordinary bumps, depressions or roughness in the roadway so that the vehicle rides smoothly when in contact with such surfaces. The more severe shocks occasioned by encountering large bumps and depressions overcomes the reinforced section of the spring and the shock is distributed throughout the entire spring in such a manner that the resilient properties of the spring are most effectively utilized to cushion the severe shocks which ordinarily are transmitted to the vehicle.

It will be further noted that the opposite end portions 8′ of the rebound plate 8 are tapered in thickness to more easily permit the passage of the vibrations from the outer lighter sections of the spring to the inner or heavier sections of the spring.

From the foregoing description it will be seen that the leaf spring is well adapted to absorb both light and heavy jolts.

What I claim as my invention is:

1. A spring, comprising a plurality of superposed upwardly curved leaves of relatively thin material and of varying lengths positioned in stepped formation, a master leaf of thicker material mounted on top of the longer leaf of the thin leaves and having eyed ends, and a single rebound leaf of relatively thick material and of greater length than the length of the shortest thin leaf mounted on the master leaf and curved downwardly to an extent to maintain a continuous pressure on the master leaf under all strains, said leaves forming outer spring sections defined as between the outer ends of the rebound leaf and the outer ends of the master leaf for absorbing slight shocks and an interposed section between the ends of the rebound leaf approximately rigid to slight shocks for absorbing relatively heavier shocks, said sections merging into each other between the adjacent ends of the shorter thin leaf and the rebound leaf.

2. A spring, comprising a plurality of upwardly curved superposed leaves of relatively thin material and of varying lengths positioned in stepped formation, a master leaf of thicker material mounted on top of the longer leaf of the thin leaves and having an eyed end, said master leaf being curved in the same direction as the superposed leaves, and a single rebound leaf of relatively thick material and of greater length than the length of the thin leaf mounted on the master leaf and curved in the opposite direction to the superposed leaves to exert a continuous strain thereon in the same direction as the strain of all of the loads which the spring is adapted to support, said leaves forming outer yielding sections defined as between the outer ends of the rebound leaf and the outer ends of the master leaf, responsive to light shocks or vibrations and an interposed yielding section defined as between the ends of the rebound leaf approximately rigid to slight shocks and responsive only to heavier shocks and vibrations, the responsive quality of each yielding section gradually merging into the other yielding sections, between the adjacent ends of the shorter thin leaf and the rebound leaf.

3. A spring, comprising a plurality of upwardly curved superposed leaves of relatively thin material and of varying lengths positioned medially in stepped formation, a master leaf of thicker material mounted on top of the longer leaf of the superposed leaves and having eyed ends, said master leaf being curved in the same direction as the superposed leaves, and a single rebound leaf of relatively thick material and of greater length than the length of the shorter thin leaf mounted medially on the master leaf and curved in the opposite direction thereto to exert a continuous strain thereon in the same direction as the strain of the load the spring is adapted to support, the opposite end portions of the rebound leaf being tapered, said leaves forming an outer yielding section defined as between the outer ends of the rebound leaf and the outer ends of the master leaf responsive to light shocks or vibrations and an intermediate section defined as between the ends of the rebound leaf approximately rigid to slight shocks and responsive only to heavier shocks and vibrations, the responsive quality of the outer yielding sections gradually merging into the intermediate yielding section between the adjacent ends of the shorter thin leaf and the rebound leaf.

4. A spring comprising a plurality of superposed similarly upwardly curved leaves, each of said leaves being formed of material not exceeding two hundred three thousandths (0.203) of an inch in thickness, a master leaf of thicker material and of the same curvature as the thin leaves and mounted on top of the thin leaves, said leaves decreasing substantially uniformly in length from the lower leaf adjacent the frame to the master leaf, an oppositely curved single rebound spring leaf of relatively thick material and of greater length than the length of the shorter thin leaf positioned on top of the master leaf so that its concaved side is adjacent the concaved side of the nearest of the leaves first mentioned, and means to clamp said rebound leaf to all of the other leaves so that its curvature is made to conform substantially to that of the first mentioned leaves and to maintain a continuous strain thereon, said leaves forming outer yielding sections defined as between the outer ends of the rebound leaf and the outer ends of the master leaf responsive to light shocks or vibrations and an intermediate yielding section defined as between the ends of the rebound leaf approximately rigid to slight shocks and responsive mainly to heavier shocks and vibrations, the responsive quality of each yielding section gradually merging into the intermediate yielding section between the adjacent ends of the shorter thin leaf and the rebound leaf.

In testimony whereof, I affix my signature.

EDWARD J. HARVEY.